(12) United States Patent
Elliott et al.

(10) Patent No.: US 6,675,244 B1
(45) Date of Patent: Jan. 6, 2004

(54) SCSI DATA RATE SPEED DETERMINATION

(75) Inventors: Robert C. Elliott, Houston, TX (US); William C. Galloway, Houston, TX (US)

(73) Assignee: Hewlett-Packard Development Company, L.P., Fort Collins, CO (US)

( * ) Notice: Subject to any disclaimer, the term of this patent is extended or adjusted under 35 U.S.C. 154(b) by 0 days.

(21) Appl. No.: 09/507,000

(22) Filed: Feb. 18, 2000

Related U.S. Application Data

(60) Provisional application No. 60/120,838, filed on Feb. 19, 1999.

(51) Int. Cl.[7] ............................................. G06F 13/16
(52) U.S. Cl. ......................... 710/107; 710/33; 710/60; 710/107
(58) Field of Search ............................. 710/33, 60, 107

(56) References Cited

U.S. PATENT DOCUMENTS

| | | | |
|---|---|---|---|
| 5,450,548 A | * 9/1995 | Matsushima | 710/61 |
| 5,463,743 A | 10/1995 | Galloway | 395/285 |
| 5,522,054 A | 5/1996 | Gunlock et al. | 395/439 |
| 5,613,074 A | 3/1997 | Galloway | 395/280 |
| 5,675,723 A | 10/1997 | Ekrot et al. | 395/182.02 |
| 5,692,200 A | 11/1997 | Carlson et al. | 395/735 |
| 5,751,977 A | 5/1998 | Alexander | 395/306 |
| 5,878,039 A | * 3/1999 | Gorshe et al. | 370/376 |
| 5,925,120 A | * 7/1999 | Arp et al. | 710/131 |
| 5,930,483 A | * 7/1999 | Cummings et al. | 710/107 |
| 6,012,105 A | * 1/2000 | Rubbmark et al. | 710/14 |
| 6,140,850 A | * 10/2000 | Inoue | 327/141 |
| 6,223,244 B1 | * 4/2001 | Downer et al. | 710/244 |

* cited by examiner

*Primary Examiner*—Jeffrey Gaffin
*Assistant Examiner*—Mohammad O. Farooq

(57) ABSTRACT

The method of the present invention enables a SCSI repeater to dynamically determine the speed of an input device and adjust the repeater's output speed accordingly. Thus, the SCSI repeater can transparently connect independent SCSI buses that are connected to different devices with different requirements, preventing the slowest device from limiting the speed of the fastest device.

34 Claims, 11 Drawing Sheets

| ADDRESS | SIZE | DEFAULT |
|---------|------|---------|
| 90000004 | 16 | x0000 |

FIG. 5

| BIT(s) | NAME | TYPE | DEFAULT | DESCRIPTION |
|--------|------|------|---------|-------------|
| 15 | | | | |
| 14 | LINEAR | R/W | 0 | ENABLE THE LINEAR RATE FUNCTION |
| 13:12 | | | | |
| 11 | STRETCH ENABLE | R/W | 0 | ENABLE THE REQ/ACK STRETCH FUNCTION |
| 10:4 | | | | |
| 3:2 | FILTER CONTROL | R/W | 00 | USED TO THE CONTROL THE SCSI SPEED |
| 1:0 | | | | |

FIG. 6

| (240 MHz) # CLOCKS | XLATED LINEAR RATE | XLATED STEP_RATE |
|---|---|---|
| 0 | TC_SYNC_40 ⎫ | SYNC_40 |
| 1 | TC_SYNC_40 ⎬ 1 | " |
| 2 | TC_SYNC_40 ⎬ | " |
| 3 | TC_SYNC_40 ⎭ | " |
| 4 | TC_SYNC_20 ⎫ | SYNC_20 |
| 5 | TC_SYNC_20 ⎬ 3 | " |
| 6 | TC_SYNC_20 ⎭ | " |
| 7 | 5 | " |
| 8 | 6 | " |
| 9 | 7 | " |
| 10 | TC_SYNC_10 ⎫ | SYNC_10 |
| 11 | TC_SYNC_10 ⎬ 9 | " |
| 12 | TC_SYNC_10 ⎭ | " |
| 13 | 11 | " |
| 14 | 12 | " |
| 15 | 13 | " |
| 16 | 14 | " |
| 17 | 15 | " |
| 18 | 16 | " |
| 19 | 17 | " |
| 20 | 18 | " |
| 21 | 19 | " |
| 22 | TC_SYNC_5 ⎫ | |
| 23 | TC_SYNC_5 ⎬ 21 | |
| 24 | TC_SYNC_5 ⎭ | |
| 25 | 23 | |
| 26 | 24 | |
| 27 | 25 | |
| 28 | 26 | |
| 29 | 27 | |
| 30 | 28 | |
| 31 | 29 | |
| DEFAULT | TC_SYNC_5 | SYNC_5 |

FIG. 8

ON SCSI CLK PULSE:
    LINEAR_NEW_RATE <=
        XLATED_LINEAR_RATE
        BASED ON THE AVERAGE
        OF THE # OF CLOCKS
        IN THE PREVIOUS
        SCSI CLOCK AND
        THE CURRENT SCSI
        CLOCK
    LINEAR_STEP_RATE <=
        XLATED_STEP_RATE
        BASED ON THE AVERAGE
        OF THE # OF CLOCKS
        IN THE PREVIOUS
        SCSI CLOCK AND
        THE CURRENT SCSI
        CLOCK

IMMEDIATELY AFTER SCSI CLK PULSE
    LINEAR_RATEL <=
        LINEAR_NEW_RATE IF
        THE CURRENT SCSI CLK
        HAS NOT SIGNIFICANTLY
        DEVIATED FROM PREVIOUS
        CLOCK, THE NEW RATE IS
        NOT SLOWER THAN THE
        OLD RATE, AND A
        PREDETERMINED NUMBER
        OF SCSI CLKS (4)
        HAVE BEEN SAMPLED
        WITHOUT SIGNIFICANT
        DEVIATIONS BETWEEN
        SUCCESSIVE SAMPLES AND
        LINEAR BIT SET

ON CLOCK PULSE,
    RATEL <=
      ASYNC IF NOT DATA PHASE
      ELSE LINEAR_STEP_RATE IT
        THE CURRENT SCSI CLK HAS NOT
        SIGNIFICANTLY DEVIATED FROM PREV. CLOCK,
        THE NEW RATE IS NOT SLOWER THAN
        OLD RATE AND PREDETERMINED
        # OF SCSI CLOCK (4) HAVE BEEN
        SAMPLED AND LINEAR BIT SET
      ELSE RATE_DET IF RATE HAS
        NOT SLOWED, RATE_DET IS
        UNCHANGED OVER TWO SCSI
        CLOCKS AND SIGNAL IS NOT ASYNC
      ELSE SYNC_5
        IF DEFAULT TO SYNC_5

FIG. 9

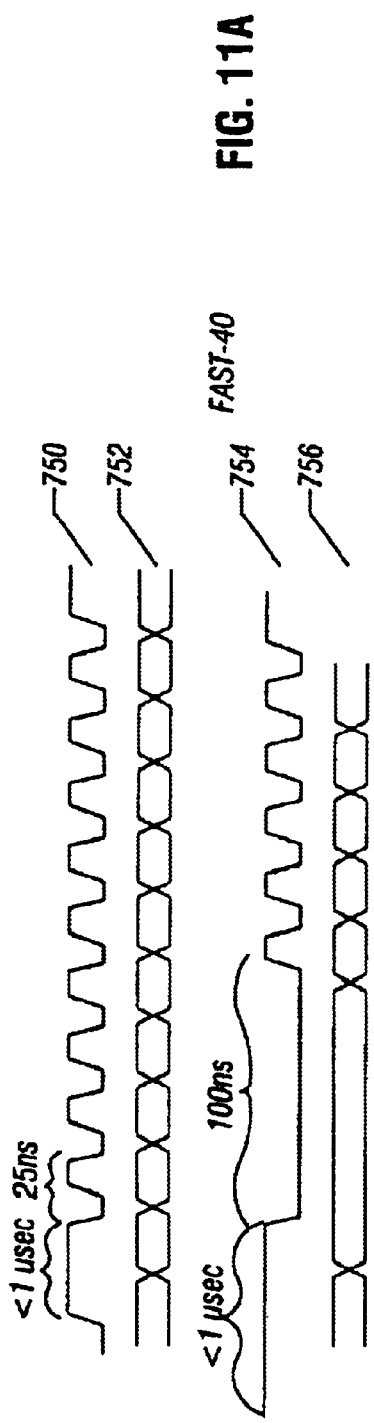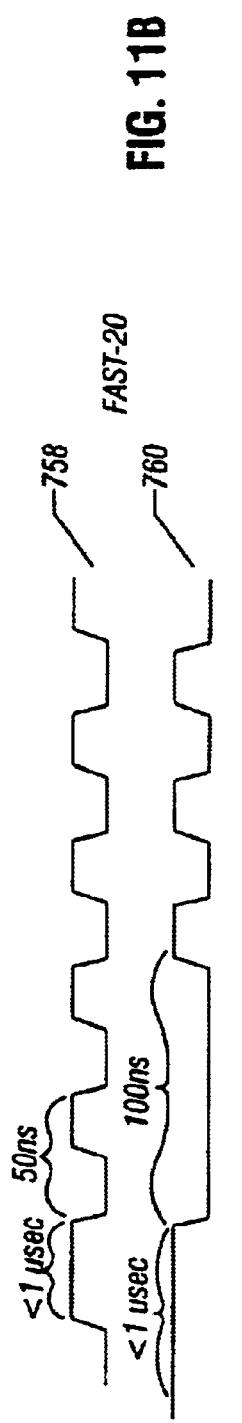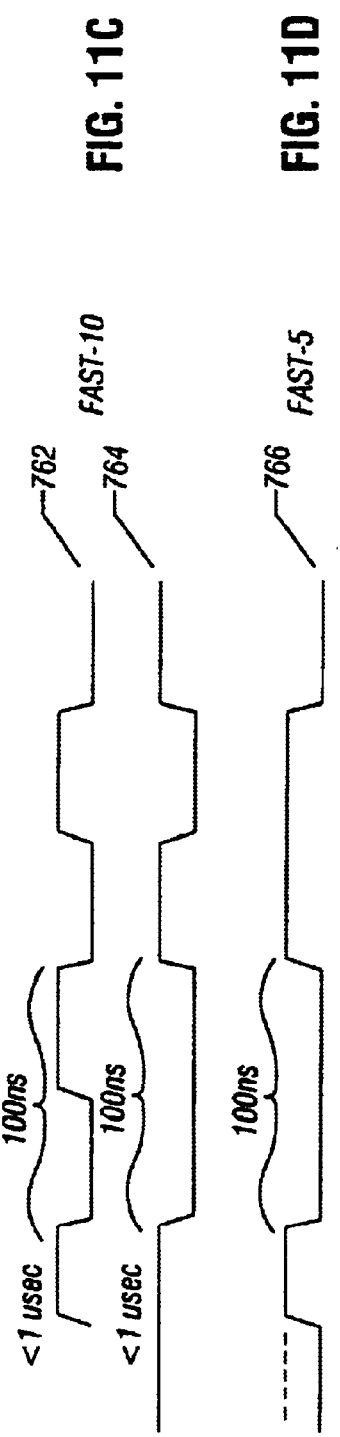
FIG. 11A
FIG. 11B
FIG. 11C
FIG. 11D

SCSI DATA RATE SPEED DETERMINATION

This application claims the benefit of U.S. Provisional Application No. 60/120,838, filed Feb. 19, 1999, which is incorporated herein by reference.

BACKGROUND OF THE INVENTION

1. Field of the Invention

The present invention relates generally to a method of and apparatus for a SCSI repeater to determine the repeater's input speed, buffer input signals and clean up output signals. More specifically, the present invention pertains to a method to allow a SCSI repeater to dynamically determine the speed of an input signal and output a clean signal at a rate that corresponds to the input signal.

2. Description of the Related Art

As long as there have been computers, users have attached peripheral hardware devices to them. Some of the typical hardware interfaces include Integrated Drive Electronics (IDE) and Enhanced IDE (EIDE) buses. One of the more popular and enduring interfaces is the small computer system interface (SCSI) bus. While an IDE bus is restricted to two disk drives and an EIDE bus is restricted to four devices, including hard disks and CD-ROM drives, the SCSI bus is able to support up to fifteen devices such as disk drives, CD-ROM drives, optical drives, printers, and communication devices. One of the attractions of the SCSI bus is its ability to easily adapt to new types of devices by using a standard set of commands, or the SCSI-3 command set.

The SCSI protocol specifies that communication between an initiator, or device that issues SCSI commands, and a target, a device that executes SCSI commands, takes place in phases: BUS_FREE, ARBITRATION, SELECTION, RE-SELECTION, COMMAND, DATA, MESSAGE_IN, MESSAGE_OUT and STATUS. The first four phases, BUS_FREE, ARBITRATION, SELECTION, and RE-SELECTION, are known collectively as the ADDRESS phases and are used to setup a connection between an initiator and a target device.

The BUS_FREE phase is the initial state and, during the BUS_FREE phase, any SCSI device on a particular SCSI bus can attempt to take control of the bus. Often two or more devices request control at the same time (or within the period of a "bus settle delay"—typically 400 ns). Which device gains control is determined in the ARBITRATION phase. After the ARBITRATION phase, the SELECTION phase is performed where the initiator selected in the ARBITRATION phase signals a specific target device that a service is requested. The RE-SELECTION phase is required when an interrupted connection needs to be reestablished.

The final phases, COMMAND, DATA, MESSAGE_IN, MESSAGE_OUT and STATUS, are known collectively as the DATA phases. During the DATA phases, the target device receives commands from the initiator, the two exchange data, and, if necessary, messages and status information are communicated.

If a data transfer is asynchronous, the initiator and the target participate in a handshaking scheme to insure the reliability of the communication. Typically, every data element sent is accompanied by a clock. The target uses the REQ# signal to initiate transfers; the initiator uses an ACK# signal to complete transfers. In the case DATA_IN, or a target sending data to a initiator, the target asserts the REQ# signal to indicate that a byte or word is available and the initiator asserts the ACK# signal to indicate that the byte or word has been received. In the case of DATA_OUT, or a target receiving data from the initiator, the target asserts REQ#, to which the initiator responds by placing data on the bus and asserting ACK#. The target then de-asserts REQ# to acknowledge receipt and the initiator asserts ACK# in response. The handshaking requirements of the SCSI protocol add a large overhead to asynchronous data transfers.

A synchronous data transfer, on the other hand, does not require this element-byelement protocol. During synchronous data transfer, a target does not wait for an individual acknowledgement of each transfer, but rather, employs an "offset value" and transmits that number of REQ#s before requiring an ACK#. The offset is a limit on the number of unacknowledged REQ#s that are allowed before the target must pause and wait for an acknowledgement from the initiator. The data in asynchronous transactions is clocked by the sender's REQ# or ACK# line.

To maximize performance, a SCSI bus should not exceed a predetermined length. For example, the predetermined length can be exceeded when a server, located in one box or unit, is connected through a SCSI bus to a mass storage subsystem, such as a disk drive array or a CD-ROM drive located in another box or unit. To prevent performance degradation, designers have implemented what is known as repeater circuits. Repeater circuits are used to couple short, terminated SCSI bus segments. The repeater circuit includes two ports with each port connected to a different terminated SCSI bus segment. The repeater circuit provides a buffer between the terminated bus segments in order to achieve a high performance SCSI bus that exceeds the predetermined length. To a SCSI controller, the terminated bus segments appear as a single SCSI bus.

SUMMARY OF THE INVENTION

The present invention relates to the determination of a data rate on a SCSI repeater. Typically, repeaters simply buffer SCSI signals; they do not improve the quality of the signal. The SCSI interface is extremely flexible; it is used to attach many different types of devices such as optical scanners, disk drives, tape drives, and CD-ROM drives to a computer some of which may need to be located at a distance from the computer. The method of and apparatus for the present invention determines the speed of SCSI input so that the output can be "squared up" and the duty cycle restored. Squaring up the signal improves the quality of the signal.

The method of and apparatus for the present invention determine the synchronous data rate of the input bus during a SCSI data phase and, depending upon whether a Linear Rate function is selected, either matches the output clock speed to the input clock speed or snaps the output bus speed to the closest standard SCSI data rate.

When the Linear Rate function is not selected, the incoming data is classified into one of the following categories: asynchronous, synchronous-10, synchronous-20, or synchronous-40. The categorized rate can increase during a data transfer but it may not decrease. In other words, data may transfer at a negotiated rate or less, increasing during the transfer up to the negotiated rate. The rate of the output is determined by the rate of the input. All non-data phases are classified as asynchronous.

When the Linear Rate function is selected, the output SCSI clock tracks the input SCSI clock period in resolutions of two 240 MHz clock periods. There is a "snapping" effect around the standard rates of 5, 10, 20 and 40 MHz. For example, an input clock rate of 5.1 MHz may map to 5 MHz but an input rate of 6.1 MHz maps to an output clock rate of 6.1 MHz.

BRIEF DESCRIPTION OF THE DRAWINGS

A better understanding of the present invention can be obtained when the following detailed description of the preferred embodiment is considered in conjunction with the following drawings, in which:

FIG. 5 is a table showing possible values within a control register in the SCSI repeater for memory location, memory location size, and a default values that may be utilized by the method of the present invention;

FIG. 6 is a table showing a detailed example of values for bits in a control register within the SCSI repeater;

FIG. 8 is a table illustrating linearized output data rates and "snap to" step data rates of a SCSI clock signal corresponding to the number of integrated circuit clock cycles and input signal requires;

FIG. 9 is a table of signals illustrating the conditions in which certain linearized and step function output clock signals are generated;

FIGS. 11A–11D are timing diagrams illustrating the first clock stretching according to the invention.

DETAILED DESCRIPTION OF INVENTION

This application is related to the following co-pending, concurrently filed, and commonly assigned United States patent applications which are hereby incorporated by reference:

U.S. patent application Ser. No. 09/507,278, entitled "SCSI Repeater Circuit With SCSI Address Translation And Enable;"

U.S. patent application Ser. No. 09/506,709, entitled "Communication Mode Between SCSI Devices;"

U.S. patent application Ser. No. 09/507,072, entitled "SCSI Clock Stretching;" and U.S. patent application Ser. No. 09/507,071, entitled "Set Up Time Adjust."

Figure 1:
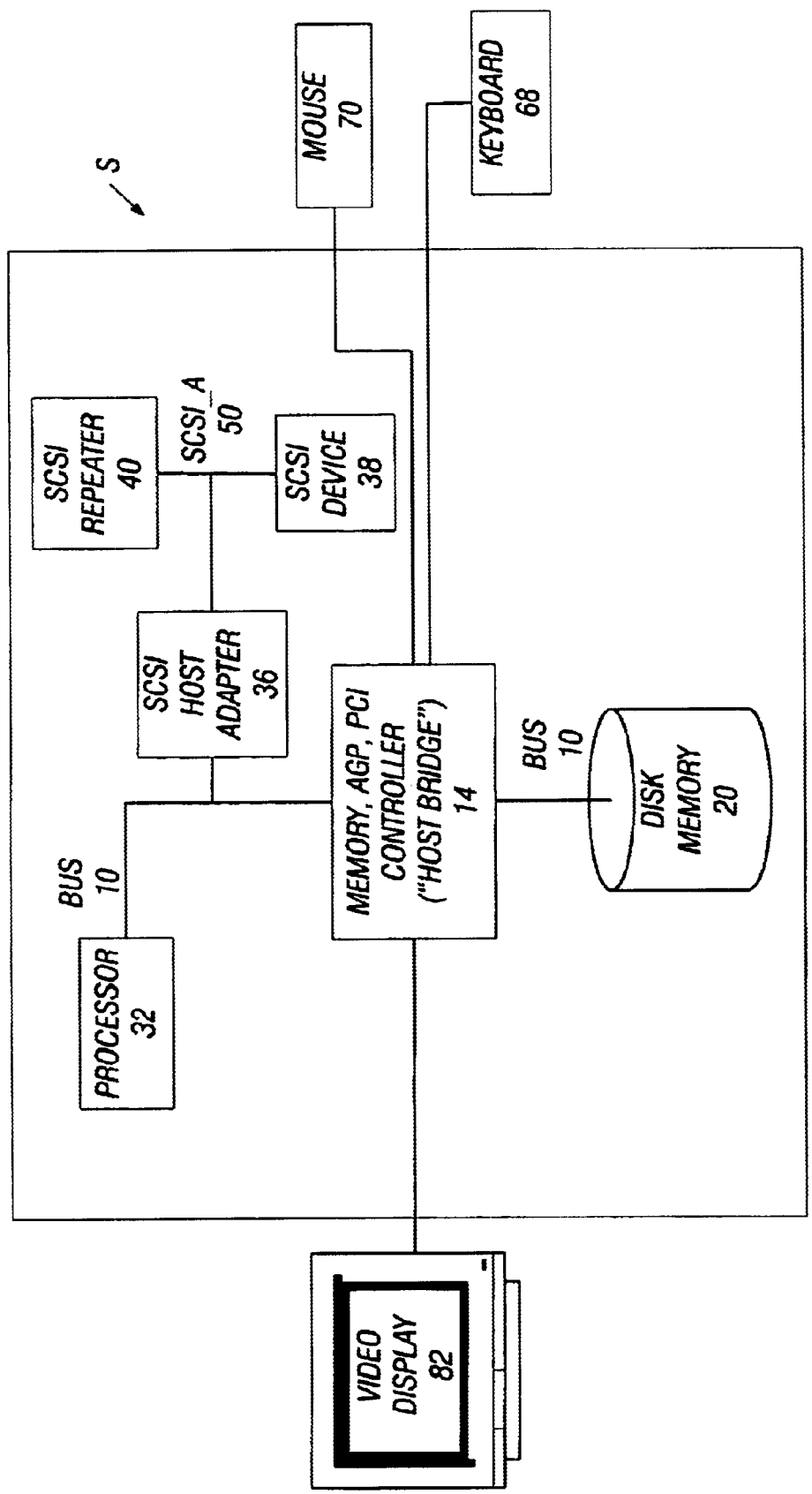
FIG. 1 is a block diagram of a computing system S showing a data bus, peripheral devices, and a SCSI host adapter.

Turning to FIG. 1, illustrated is a typical computing system S in which a bus repeater utilizing the method of the present invention can be installed. The computing system S in the illustrated embodiment is a PCI bus based machine, having a peripheral component interconnect (PCI) bus 10. The PCI bus 10 is controlled by PCI controller circuitry located within a memory/accelerated graphics port (AGP)/PCI controller 14. This controller 14 (the "host bridge") couples the PCI bus 10 to a processor 32 and a disk memory subsystem 20.

The host bridge 14 in the disclosed embodiment is a 440LX Integrated Circuit by Intel Corporation, also known as the PCI AGP Controller (PAC). The processor 32 is preferably a Pentium II, manufactured by the Intel Corporation of Santa Clara, Calif. The processor 32 could be replaced with a different processor, other than the Pentium II, without detracting from the spirit of the invention. A video display 82, a mouse 70 and a keyboard 68 are also coupled to the host bridge 14, enabling human interaction with the computing system S.

Finally, a SCSI host adapter 36 is shown connected to the PCI bus 10. Connected to the SCSI host adapter 36 by means of a SCSI_A bus 50 are a SCSI device 38 and a SCSI repeater 40 (see previously incorporated U.S. patent application entitled "SCSI Repeater Circuit With SCSI Address Translation And Enable"). The SCSI device 38 might be an internal device such as a CD-ROM drive or a tape drive. For the purposes of this example, the SCSI repeater 40 utilizes the method of the present invention, for example to enable the SCSI repeater 40 to transparently connect a second SCSI_B1 bus 352 with slow disk drives 320, 322, and 324 (see FIG. 3) to the SCSI_A bus 50.

In a SCSI configuration, a SCSI host adapter 36 must follow the same communication protocol as any other SCSI device and appears to a target as would any other SCSI device. The selection of the SCSI repeater 40 as an example of a device that would use the method of the present invention is arbitrary; many devices that relay signals between SCSI buses might use the present method. In addition, the computing system S illustrates only one platform that utilizes the method according to the present invention. The method of the present invention is also not necessarily restricted to a SCSI bus or SCSI devices; any device that bridges computer buses of any type can employ the method.

Figure 2:
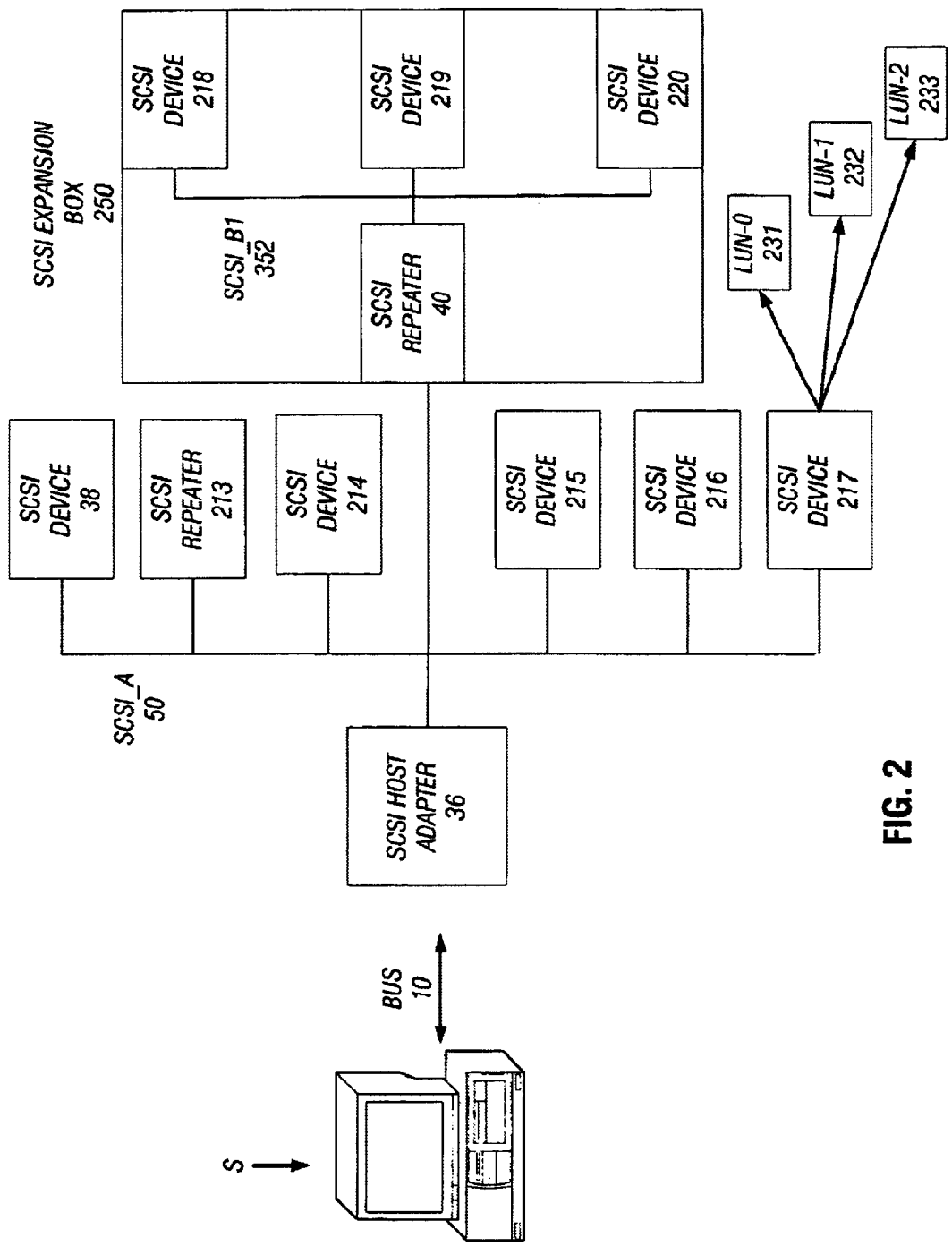
FIG. 2 is a block diagram of a portion of the computing system S showing the SCSI host adapter, a SCSI bus, and a number of additional SCSI devices.

Turning now to FIG. 2, illustrated is a portion of the computing system S showing the SCSI host adapter 36, SCSI_A 50, a SCSI_B1 bus 352, the SCSI device 38, the SCSI repeater 40 which is installed in a SCSI expansion box 250, additional SCSI devices 214–220 and a SCSI repeater 213 which is similar to SCSI repeater 40. The expansion box 250 illustrates a typical configuration that employs a SCSI repeater 40. The SCSI devices 218–220 are located in the SCSI expansion box 250, physically separate from the computing system S, and yet still accessible through SCSI_A 50.

Also shown are three logical units (LUNs) 231–233. LUNs 231–233 represent multiple units that together make up the single SCSI device 217. An example of this configuration might be a bank of disk drives where each drive is assigned a LUN ID and all are accessed thorough a single SCSI ID. A SCSI ID uniquely identifies each device on a particular SCSI bus but further identification may be necessary to perform a specific transaction. The SCSI repeaters 40 and 213 appear to the SCSI host adapter 36 as would any other SCSI device, utilizing standard SCSI protocols as well as the method of the present invention.

Figure 3:
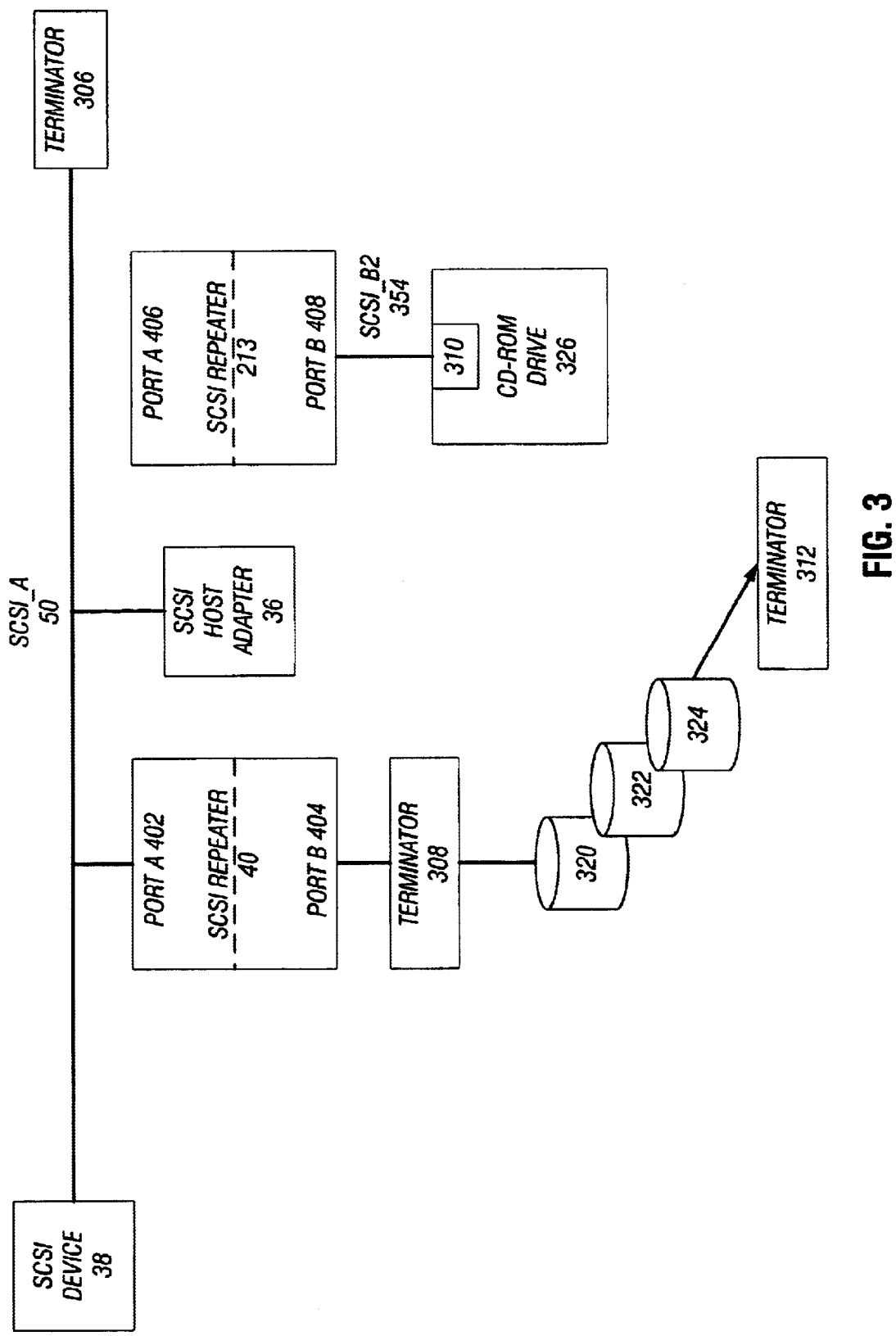
FIG. 3 is a block diagram of a SCSI bus showing two SCSI repeaters on which the method of the present invention might be implemented.

Turning now to FIG. 3, illustrated is SCSI_A 50 of the computing system S. For simplicity, the SCSI host adapter 36, the SCSI device 38, and the two SCSI repeaters 40 and 213 are the only SCSI devices from FIG. 2 that are shown. The SCSI repeaters 40 and 213 are divided into port A 402 and 406 and port B 404 and 408 respectively (see FIG. 4).

Port A 402 of repeater 40 and port A 406 of repeater 213 are both connected to SCSI_A 50. Port B 404 of repeater 40 and port B 408 of repeater 213 are connected to the SCSI_B1 352 and a SCSI_B2 bus 354 respectively.

Typically SCSI buses employ termination to prevent reflection and improve signal quality, and a terminator 306 on SCSI_A 50 is illustrated. SCSI repeaters 40 and 213 are representative of devices on which the method of the present invention is implemented. SCSI repeaters 40 and 213 might serve as targets for the SCSI host adapter 36, functioning as an initiator. SCSI repeater 40 is connected to a bank of disk drives 320, 322, and 324 by means of SCSI_B1 552. In addition, SCSI_B1 352 is terminated by a pair of terminators 308 and 312. The SCSI repeater 213 is connected to a single SCSI device, a CD-ROM drive 326, by means of the SCSI_B2 354. SCSI B2 354 is terminated by a terminator 310 that is internal to the CD-ROM drive 326. It is not necessary that SCSI devices 40 and 213 are connected to disk drives or a CD-ROM drive; they may be connected to other types of devices such as printers or communication devices without distracting from the spirit of the invention.

Figure 4:
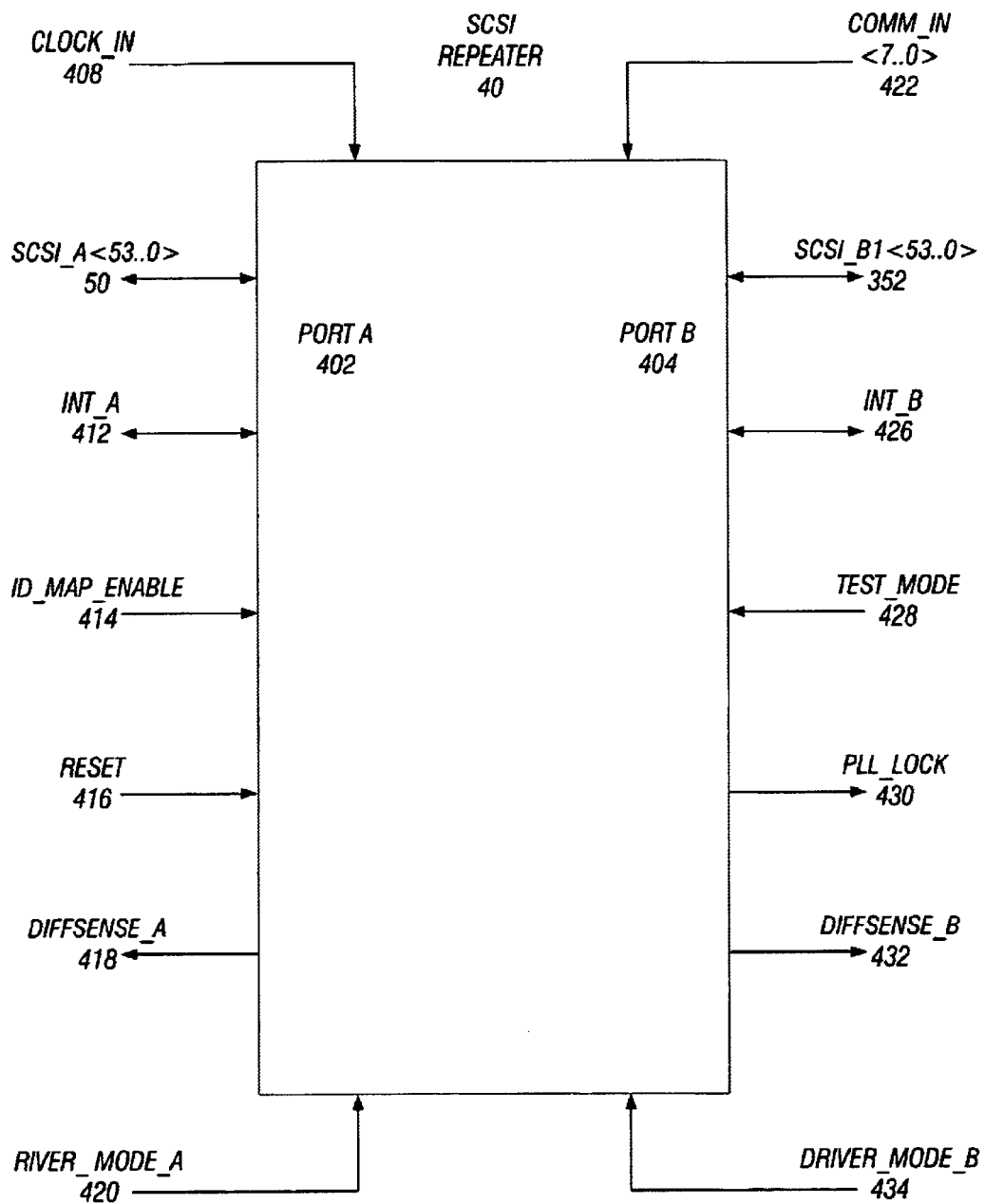
FIG. 4 is a signal diagram illustrating the input and output signals of a SCSI repeater that utilizes the method of the present invention.

Turning now to FIG. 4, illustrated are the input and output signals of the SCSI repeater 40 which might employ the method according to the present invention. Now referring to port A 402 of repeater 40, SCSI_A<53..0> 50 represents fifty-four signals that the SCSI repeater 40 can provide to and receive from a wide multi-mode SCSI bus coupled to port A 402. As explained above, SCSI_A<53..0> 50 can address up to 16 SCSI bus devices during a SELECT phase of the standard SCSI protocol through the data signals of SCSI_A<53..0> 50, represented by DBA<15..0> (not shown). An initiator 38, or controller 36 (not shown in FIG. 4), is coupled to SCSI_A<53..0> 50 and occupies one SCSI device address, or SCSI ID. A SCSI ID refers to one bit of the data bus of the SCSI bus, DBA<15..0>, that is assigned to a SCSI device. Targets, such as disk drives, typically occupy the remaining 15 SCSI IDs.

In normal operation, the SCSI repeater 40 drives all signals asserted on port A 402 to port B 404 and all signals asserted on port B 404 to port A 402. An INT_A signal 412 on port A 402 and an INT_B signal 426 on port B 404, which may be used for side-band signaling, are not relevant to the present invention.

A DRIVER_MODE_A 420 signal controls the SCSI buffer driver modes for SCSI_A 50. Possible mode values include single-ended, low voltage differential and disabled. The current mode of the DRIVER_MODE_A 420 is determined by checking a DIFFSENSE_A signal 418.

Now referring to port B 404 of SCSI repeater 40, SCSI_B1<53..0> 352 represents the signals that repeater 40 can provide to and receive from a wide multi-mode SCSI bus coupled to port B 404. Similar to SCSI_A<53..0> 50, SCSI_B1<53..0> 352 includes data signals, represented by DBB<15..0>, that can address up to sixteen SCSI devices. In one embodiment utilizing repeater 40, port B 404 is actually coupled to narrow SCSI buses that can address a limit of eight SCSI devices. A DRIVER_MODE_B signal 434 provides similar functions on SCSI_B1<53..0> 352 as the DRIVER_MODE_A signal 420 provides on SCSI_A<53..0> 50. The current mode of DRIVER_MODE_B signal 434 is determined by checking a DIFFSENSE_B signal 432.

Now referring to signals not specific to either port A 402 or port B 404, a CLOCK_IN 408 signal provided to control all timing internal to the SCSI repeater 40. Typically, the signal is 40 MHz with a 60/40 duty cycle. In the present example, the SCSI repeater 40 may multiply the CLOCK_IN 408 signal to derive a 240 MHz clock used internal to the SCSI repeater 40.

An ID_MAP_ENABLE ("MAP") signal 414 causes narrow targets on the SCSI_B1 352 to be mapped to the high addresses on SCSI_A 50. A PHASE_LOCK_LOOP_LOCK (PLL) signal 430 reports, when interrogated, whether a phase lock loop (PLL) in the SCSI repeater 40 is locked or unlocked. A RESET 416 signal puts the SCSI repeater 40 into a known state. A TEST_MODE signal 428, when asserted, forces the SCSI repeater 40 into a test mode such as a pass-through mode that passes all signals from the port A 402 to port B 404 and all signals from port B 404 to port A 402. A COMM IN <7..0>signal 422 represents data lines that are utilized during an in-band, non-SCSI protocol messaging (see previously incorporated U.S. patent application entitled "Communication Mode Between SCSI Devices").

The SCSI buses coupled to port A 402 and port B 404 undergo SCSI bus phases which include ADDRESS and DATA SCSI bus phases. Because both of these SCSI buses concurrently undergo the same phase, the phase occurring on both buses will be referred to as the SCSI bus phase.

Address translation, or mapping functions, for SCSI repeater 40 are enabled by an ID_MAP_ENABLE ("MAP") signal 414 of SCSI repeater circuit 40. When MAP 414 is TRUE, SCSI repeater 40 performs address translation during ADDRESS phases of the SCSI protocol.

During the DATA phases of the SCSI protocol, the data signals on the SCSI buses coupled to ports A 402 and B 404, represented by DBA<15..0> and DBB<15..0>, are transferred either synchronously or asynchronously by the SCSI repeater 40. Furthermore, during the DATA phases of the SCSI protocol, DBA<1 5..> and DBB<15..0> are mapped directly to each other which means DBA<15> is mapped to DBB<15>, DBA<14> is mapped to DBB<14> and so forth.

Turing now to FIG. 5, illustrated is one embodiment of a control buffer within a SCSI repeater 40. The first column, labeled "Address," contains a typical address location within a memory device (not shown) within a SCSI repeater 40 where the control buffer might be stored. The second column, labeled "Size," is the amount of memory in bits that the control buffer of this embodiment requires. In this case it is sixteen bits. The third column, labeled "Default," shows the value that is loaded into the control buffer at system startup or following a reset signal.

Turning now to FIG. 6, illustrated is a table showing the sixteen bits of the memory location of FIG. 5. The first column, labeled "Bit(s)," contains specific bit locations for that particular row. For example, the top row refers to bit 15 of the memory location described in FIG. 5. For simplicity, the values in fields for bits 15, 13:12, 10:4 and 1:0 are not shown because they are not relevant to the present invention. The second column, labeled "Name," specifies a particular control finction that the bits in column 1 control. The method of the present invention employs the information stored in row, representing bit 14, and row 6, repesenting bits 3:2.

The value in row 2, representing bit 14, enables or disables a Linear Rate function. When enabled, the output SCSI clock period tracks the input SCSI clock period. In the present embodiment, the resolution is in multiples of two 240 MHz clock periods. In addition, there is a "snapping" effect around standard SCSI rates of 5, 10, 20 and 40 MHz. For example, an input rate of 5.1 MHz may snap to 5 MHz but an input rate of 6.1 MHz maps to an output rate of 6.1 MHz.

The third column, labeled "Type," indicates whether the value of that particular row can be read (R), written (W), or both (R/W). In this embodiment, the memory location of row 6, representing bits 3:2, can be both read and written. The fourth column, label "Default," contains a value that the memory location is set to when the SCSI repeater 40 is initialized or reset. The fifth column, labeled "Description," contains explanations of what specific rows refer to. In the case of row 6, the information refers to control of the SCSI speed.

Figure 7:
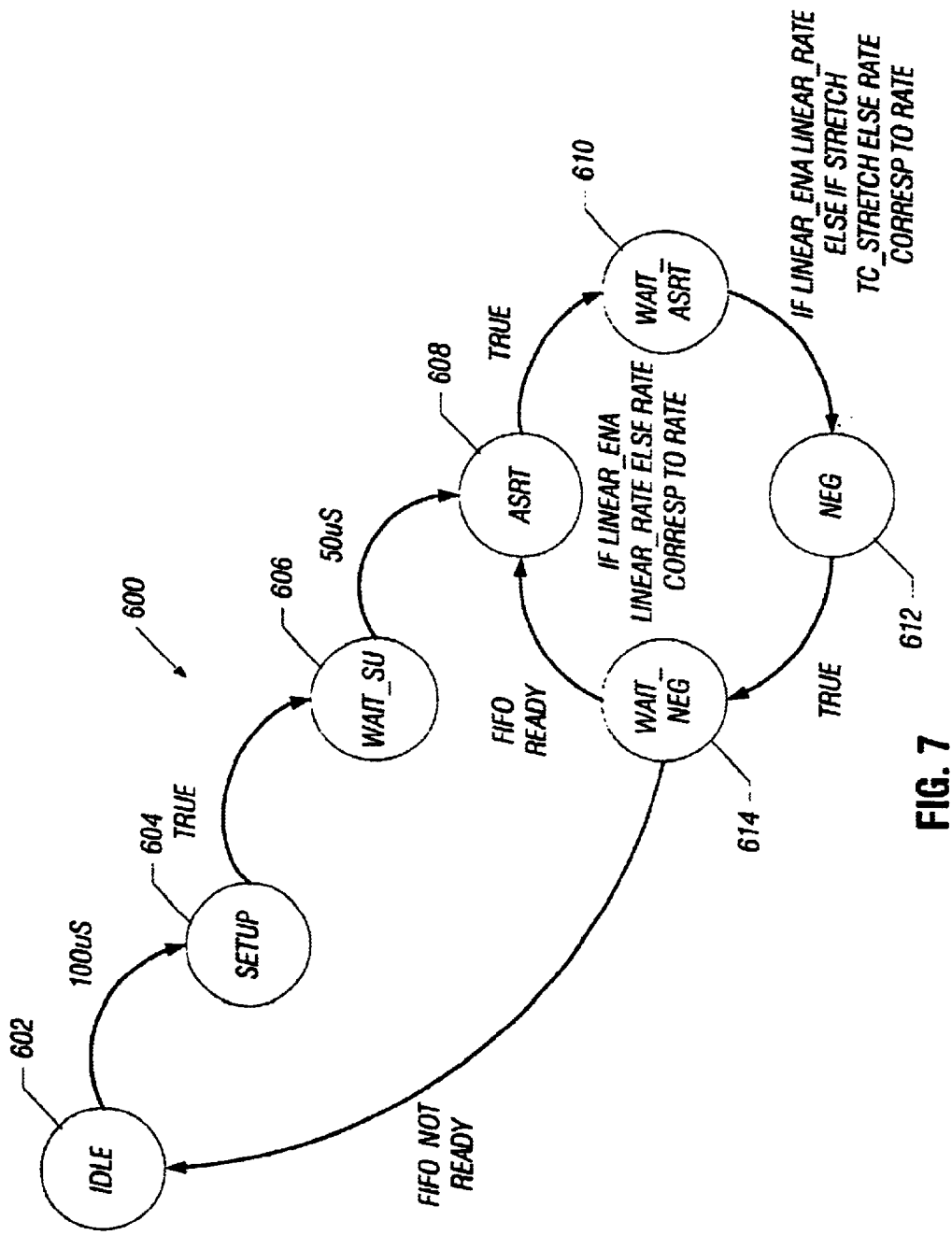
FIG. 7 is a state diagram illustrating a SCSI REQ# or ACK# clock generation state machine that implements both output stretching and output linearization.

Turning to FIG. 7, illustrated is a state machine 600 employed to generate the REQ and ACK clocks in the SCSI repeater 40. This state machine responds to adaptive speed determination referred as well as to the linear rate function discussed in conjunction with FIG. 6. Further, this state machine 600 implements first clock stretching according to the invention when the corresponding REQ or ACK signals have been idle for a predetermined period of time. It will be appreciated that the state machine 600 can be implemented both for the REQ and ACK clock signal with little modification. The state machine 600 has been simplified for clarity to better illustrate the functions according to the invention. It will be appreciated that a number of events may occur to cause a delay in transfer from one state to another, such as data FIFOs being cleared, not ready, or error conditions occurring.

Beginning from an idle state 602, when data becomes available for transfer from one port of the repeater 40 to the other, the state machine 600 transitions to a SETUP state 604, with an approximately 100 nanosecond delay before the transfer. The SETUP state 604 is a transitory state that is employed to load a timer that is run during a next state, the WAIT_SU or wait for SETUP state 606. The value loaded into the timer in the SETUP state 604 is appropriate to generate an approximately 50 nanosecond delay before the state machine 600 transitions from the WAIT_SU state 606 to an assert state ASRT 608.

The ASRT state 608 is a transitory state in which the timer is loaded with a value suitable for a delay discussed in conjunction with the next state, a WAIT_ASRT state 610. The value loaded into the timer during the ASRT state 608 depends on whether the linear mode is enabled, what the determined SCSI synchronous rate is, and whether this particular clock pulse is being "stretched". These aspects are further discussed below in conjunction with FIGS. 8–12. To summarize, if the linear mode is enabled, the SCSI clock will be asserted for a number of repeater 40 clock cycles that most closely matches the incoming clock signal from the other side of the repeater 40, but with some degree of "snapping" when the rate is near a standard SCSI rate. This is firther discussed below in conjunction with FIG. 8.

If this clock assertion should be stretched, the assertion of the SCSI clock signal for this clock is stretched for a predetermined period TC_STRETCH, which in the disclosed embodiment is 100 nanoseconds. This stretching, as discussed above, "drains" DC loading on the SCSI clock lines.

Figure 10:
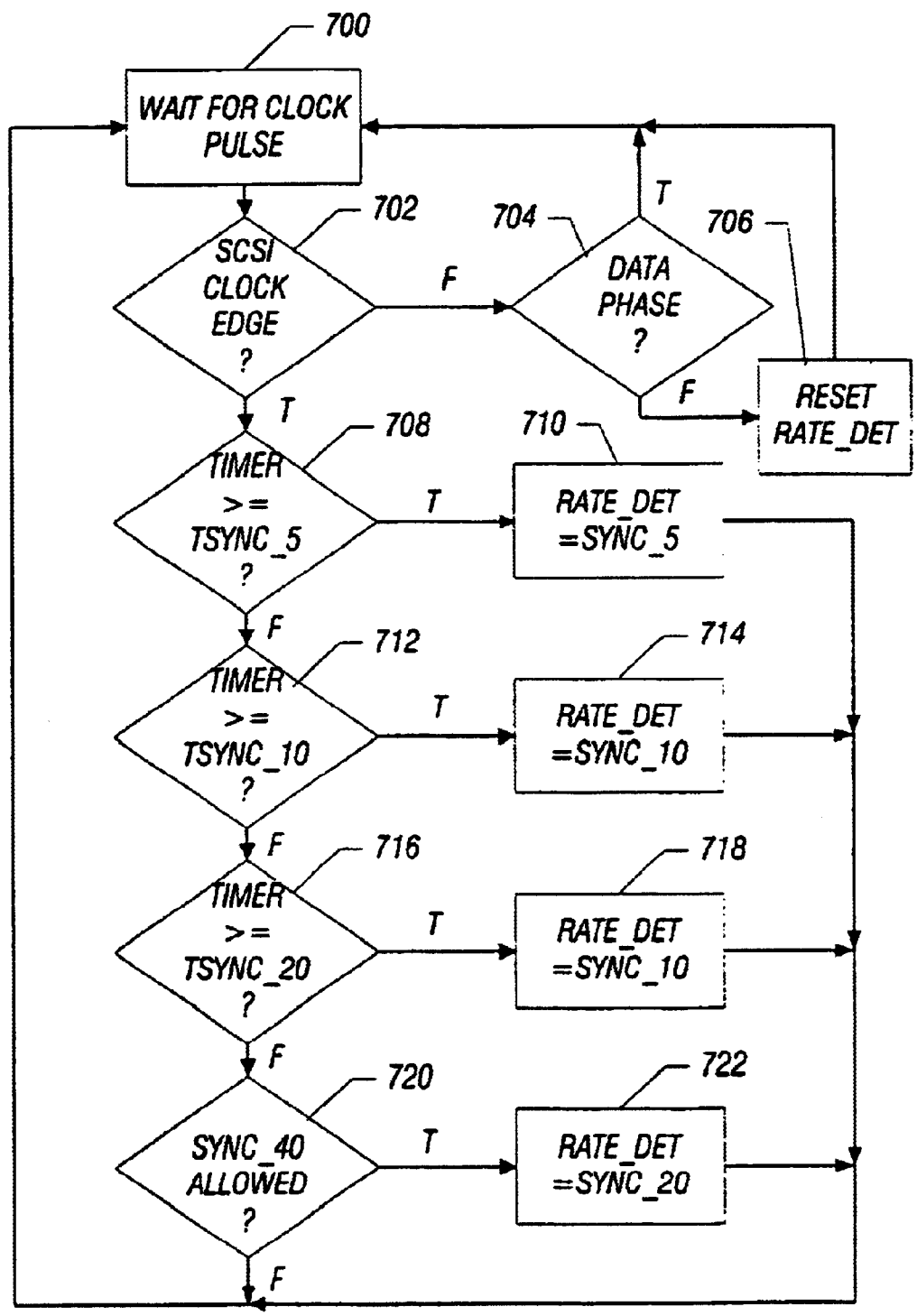
FIG. 10 is a flow diagram illustrating the application specific integrated circuit code for detecting input clock rates.

Otherwise, the length of the mutual assertions corresponds to the normal assertion for a given clock speed. This value equals 100 nanoseconds (200 ns perod) for fast_5 SCSI, 50 nanoseconds (100 ns period) for fast_10 SCSI, 25 nanoseconds (50 ns period) for fast_20 SCSI, and 12.5 nanoseconds (25 ns period) for fast_40 SCSI. Depending upon the value of the duty cycle, a RATE value, discussed below in conjunction with FIGS. 9 and 10, is determined by an input section discussed below in conjunction with FIGS. 8–10, but in any case, the output rate can only "ratchet up" and cannot slow down. Thus, the output SCSI clock from the repeater 40 may begin a synchronous transfer slowly, but increase the speed up to the speed of the input SCSI clock signal.

From the WAIT_ASRT state 610, after waiting for completion of assertion, control transfers to a NEG state 612, which is a transitory state allowing the timer to be loaded with an appropriate value to wait from the following state, a WAIT_NEG state 614. In the WAIT_NEG state 614, control will proceed to the idle state 602 if a data FIFO in the repeater 40 does not have additional data to transfer or has no additional data to receive, or will otherwise transfer to the ASRT state 608 after one-half of a clock period as set either by LINEAR_RATE or RATE, as discussed above in conjunction with the ASRT state 610. After the first assertion of the clock during the WAIT_ASRT state 610, the following clock signals are not stretched until the state machine 600 first return to the idle state 602.

Referring to FIG. 8, illustrated is a table that represents the values to be loaded into a translated linear rate register XLATED_LINEAR_RATE and a translated step rate register XLATED_STEP_RATE. As discussed below in conjunction with FIG. 9, if the linear rate is enabled, the XLATED_LINEAR_RATE value is a number of repeater 40 system clocks that most closely matches the one-half of period of the SCSI clock signal input into the repeater 40. However, as can be seen in FIG. 8, around certain values there is a "snapping" effect to a standard SCSI rate, such as fast_40, fast_20, fast_10, and fast_5. Further, in the disclosed embodiment, the XLATED_LINEAR_RATE value is the number of clocks minus three, as there are approximately three clocks of overhead in generating the assertion or negation of the SCSI clock signals in the state machine 600.

The XLATED_STEP_RATE is employed when the linear rate is not enabled, and sets the output clock rate to the highest speed standard clock rate associated with the input signal. As discussed below in conjunction with FIG. 10, the output speed can increase, but not decrease. When the input clock rate exceeds the speed possible for a particular standard clock rate, the output clock rate is "ratcheted up" to the next clock rate. Referring to the XLATED_STEP_RATE, in FIG. 8, for example, it is seen that when the input clock pulse reaches the period of two system clocks (plus three for overhead for a total of five), corresponding to 5×4.17 ns, or 20.8 ns, the XLATED_STEP_RATE value is set to fast_40, because the resulting 20 nanosecond SCSI input clock is too short for fast_20.

Turning to FIG. 9, a number of register values used to generate the RATE value and the LINEAR_RATE value are described. On every clock pulse of the 240 MHz clock of the repeater 40, the RATE value is loaded with an asynchronous value ASYNC if the repeater 40 is not in a data phase. Else, the RATE value is loaded with LINEAR_STEP_RATE, described below, if the current SCSI input clock pulse length has not significantly deviated from the previous SCSI clock pulse, the new RATE is not slower than the old RATE, a predetermined number of SCSI clocks (4) have been sampled, and the linear bit is set. Else, RATE is set to a value of RATE_DET, discussed below in conjunction with FIG. 10, if the RATE has not slowed, RATE_DET is unchanged over two SCSI clocks, and the present transfer mode is not asynchronous. Otherwise, RATE defaults to the speed for fast_5 as indicated by a value SYNC_5.

The LINEAR_STEP_RATE value discussed above is generated from the XLATED_STEP_RATE values discussed in FIG. 8, based on the average of the number of 240 MHz clocks in the previous SCSI clock pulse and the current SCSI clock. This average is driven into the table of FIG. 8 to provide the XLATED_STEP_RATE value. The LINEAR_STEP_RATE value is recalculated on each SCSI clock pulse. LINEAR_STEP_RATE is employed in the generation of RATE.

A LINEAR_NEW_RATE value is determined based upon the XLATED_LINEAR_RATE value on each SCSI clock pulse. This is based on the average of the number of clocks in the previous SCSI clock pulse and the current SCSI clock, then driven into the table of FIG. 8. The LINEAR_NEW_RATE value is employed in the generation of LINEAR_RATE. Specifically, LINEAR_NEW_RATE is copied into LINEAR_RATE immediately after a SCSI clock pulse if the length of the current SCSI clock pulse has not significantly deviated from the previous SCSI clock, the new LINEAR_RATE is not slower than the old LINEAR_RATE, and a predetermined number of SCSI clocks (4) have been sampled without significant deviations between successive samples. Finally, LINEAR_RATE is only loaded if the linear bit is set.

Turning to FIG. 10, the setting of the RATE_DET value is illustrated. This is illustrated in the form of a flowchart, but would preferably be implemented in ASIC code as a series of IF ELSE statements in combinatorial logic. On each clock pulse of the repeater 40, as indicated in a first step 700, control proceeds to a step 702 where it is determined if a SCSI clock edge is occurring. If not, control proceeds to a step 704, where it is determined whether the repeater 40 is in the data phase for this SCSI transfer. If not in the data phase, the RATE_DET value is reset at step 706. This "resets" the rate determination at the end of each data phase allowing it to "ratchet up" again during the next data phase. Otherwise, and from step 706, control proceeds back to 700.

At step 702, if the SCSI clock edge is occurring, control proceeds to step 708, where it is determined if a timer value is greater than TSYNC_5, the number of 240 MHz clocks in 5 MHz SCSI clock. The timer value is reset on each SCSI clock pulse, or when the SCSI bus is idle. If the timer is greater than or equal to TSYNC_5, indicating at least that many periods of the 240 MHz clock have passed (here 45 such cycles), then RATE_DET is set equal to SYNC_5 at step 710. Otherwise from step 708, control proceeds to step 712, where it is determined whether the timer is greater than TSYNC_10, here 21 pulses. If so, RATE_DET is set equal to SYNC_10 at step 714. Otherwise, control proceeds to step 716 where it is determined whether the timer is gareater than or equal to TSYNC_20 (here 9 pulses). If so, RATE_DET is set equal to SYNC_20 at step 718. Otherwise control proceeds to step 720, where it is determined whether TSYNC_40 is allowed, only true if the repeater 40 is in the low voltage differential mode. If so, RATE_DET is set equal to SYNC_40 at step 722. Otherwise from step 720, and in any case from steps 710, 714, 718, and 722, control loops to step 700 to wait for the next pulse of the 240 MHz clock.

At this point, it will be appreciated that the timer is reset and begun running again to determine the rate for the next SCSI clock pulse. RATE_DET is copied into RATE on each clock pulse, but only if the RATE has not slowed, the RATE is unchanged over two SCSI clocks, and the signal is not asynchronous. This is discussed above in conjunction with FIG. 9.

Turning to FIGS. 11A–D, illustrated are timing diagrams of a SCSI clock pulse (i.e., REQ or ACK, depending on the transfer direction) and associated data pulses implementing the first-clock stretching according to the invention. As discussed above, the SCSI REQ and ACK signals, if idle over time can "pre-charge" the associated signal lines such that it is difficult to maintain signal integrity on subsequent transitions of REQ or ACK. According to the invention, when the REQ or ACK line is idle for more than one microsecond, the first assertion of the corresponding REQ or ACK line is stretched for 112.5 nanoseconds, no matter what the synchronous data rate. This "discharges" the associated REQ and ACK line, such that subsequent transitions have a "cleaner" signal. Referring to FIG. 11A, illustrated is a clock signal 750 and associated data signal 752. The clock signal will either be the ACK (or ACKB) or REQ (or REQB) signal, depending on the direction of data flow, and these signals are active low. In standard fast-40 SCSI, or when the SCSI clock signal has been idle for less than one microsecond, the first clock cycle in the clock signal 750 is 25 nanoseconds long. According to the invention, when a SCSI clock signal 754 has been idle for greater than a predetermined period such as one microsecond, the first active low assertion of the pulse is stretched to 100 nanoseconds, as illustrated in the timing diagram 754 along with its associated data diagram 756.

Referring to FIG. 11B, fast-20 SCSI employs a clock that normally has a first cycle length of 50 nanoseconds, but according to the invention when idle for greater than one microsecond, the first assertion pulse of the clock is stretched to 100 nanoseconds, as illustrated by the clock signal 760. Similarly, fast-10 SCSI has 100 nanosecond peak falling edge to falling edge signal as illustrated by the clock signal 762, but when idle for greater than one microsecond, the first active low assertion for 100 nanoseconds, as illustrated by the timing diagram 764. Fast-5 SCSI, as illustrated in FIG. 11D, is the same either way—the first negation is 100 nanoseconds as illustrated by the timing diagram 766. It can be appreciated that the first negation could be dependent on the SCSI data rate, and could be stretched even further or could be adjusted depending on the loading on the SCSI bus.

Figure 12:
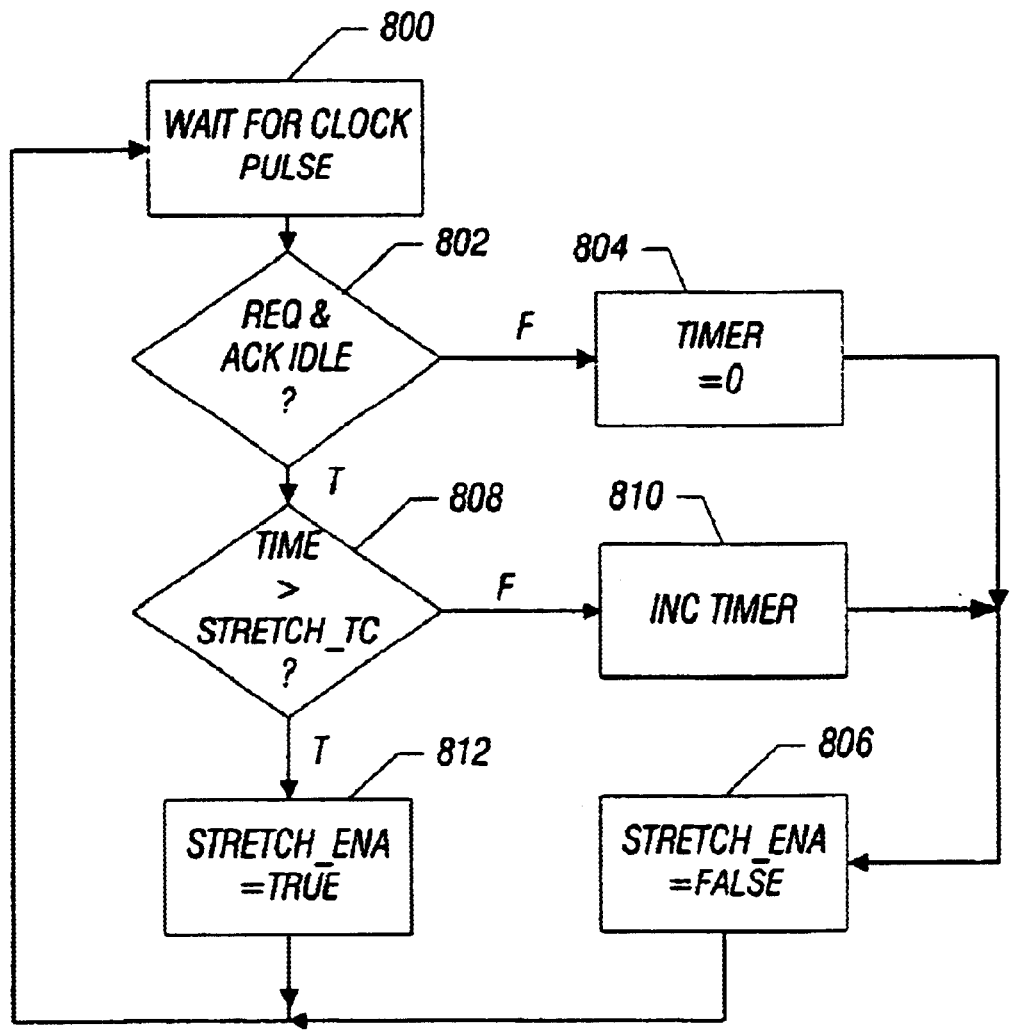
FIG. 12 is a flow diagram illustrating the application specific integrated circuit code flow for determining when a SCSI data bus has been idle for a predetermined period of time.

Referring to FIG. 12, illustrated is a flow chart which represents ASIC code implemented to determine when the REQ or ACK lines have been idle for greater than one microsecond. The code first waits for a clock pulse in a step 800, and then proceeds to a step 802 where it is determined whether REQ and ACK are idle. If not, a timer is reset to zero at step 804, and then control proceeds to step 806, where a STRETCH_ENA value is set to false.

From step 802 if REQ and ACK are idle, control proceeds to step 808, where it is determined whether the timer is greater than a STRETCH_TC value, which represents one microsecond of repeater 40 clock pulses. If not, control proceeds to step 810, where the timer is incremented, then to step 806, where STRETCH_ENA is set false. Otherwise, if the timer is greater than STRETCH_TC, control proceeds to step 812, where STRETCH_ENA is set to true, because the clocks have been idle for greater than one microsecond. Control then loops from step 806 and 812 to step 800.

Referring back to the state machine of FIG. 7, the state 610 will be appreciated that if the STRETCH_ENA value is true as set in step 812 and this is the first clock negation for a sequence of synchronous transfers, the value STRETCH is set to true, providing an initial stretching of the first SCSI clock assertion. This causes the first pulse to be stretched, discharging loading that may be present on the line, and allowing improved signal integrity for the remainder of the synchronous transfer.

As will be appreciated, the clock stretching according to the invention can be implemented in a variety of SCSI devices that act as initiators or targets on the SCSI bus. By stretching the first clock of the REQ# or ACK# signals, they can "discharge" those signals to allow for greater signal integrity on those lines. Although a 100 ns stretch is illustrated after 1 $\mu$s of inactivity, a variety of other values could be used, and further could be dependent not only on inactivity, but even on the type of transfer occurring and the particular SCSI device involved. For example, less inactivity might be required to invoke the stretching for a stretch of the clock when a higher data rate is being employed.

Further, the SCSI speed tracking according to the invention, as well as the "snapping" of the data rate or the linearization of the data rate can be implemented in a variety of repeater type devices.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method of adjusting the speed at which a SCSI bus is driven within a bus device, the method comprising the steps of:
   determining a current data rate of a first SCSI bus connected to the bus device;
   determining a standard SCSI data rate corresponding to the current data rate of the first SCSI bus when the current data rate is not equal to the standard SCSI data rate; and
   driving a second SCSI bus connected to the bus device at the standard SCSI data rate.

2. The method of claim 1, wherein the bus device is a bus repeater.

3. The method of claim 1, further comprising the step of:
   driving the second SCSI bus at a higher standard SCSI data rate if it is determined that the data rate of the first SCSI bus has increased above the standard SCSI data rate.

4. The method of claim 1, wherein the standard SCSI data rates are comprised of:
   asynchronous;
   synchronous-5;
   synchronous-10;
   synchronous-20; and
   synchronous-40.

5. The method of claim 1, further comprising the steps of:
   determining whether the first and second SCSI buses are both in a low voltage differential mode; and, if so,
   driving the first and second SCSI buses at a rate of synchronous-40.

6. A method of adjusting the speed at which a first SCSI bus is driven within a bus device, the method comprising the steps of:
   providing a clock on the first SCSI bus set at a multiple of the highest frequency of a standard SCSI bus;
   determining a current data rate of the first SCSI bus; and
   driving a second SCSI bus at a rate corresponding to a plurality of the clock cycles, wherein the plurality is set to most closely match the second SCSI bus adaptive to the current data rate of the first SCSI bus.

7. The method of claim 6, wherein the bus device is a bus repeater.

8. The method of claim 6, further comprising the step of:
   driving the second SCSI bus at an increased rate if it is determined that the data rate of the first SCSI bus has increased.

9. The method of claim 6, wherein the multiple of the highest frequency of the standard SCSI bus is 240 Mhz.

10. The method of claim 6, wherein the standard frequencies of a SCSI bus are comprised of:
    asynchronous;
    synchronous-5;
    synchronous-10;
    synchronous-20; and
    synchronous-40.

11. A SCSI repeater circuit, the repeater circuit comprising:
    logic for determining a current data rate of a first SCSI bus connected to the repeater circuit;
    logic for determining a standard SCSI data rate corresponding to the current data rate of the first SCSI bus when the current data rate is not equal to the standard SCSI data rate; and
    logic for driving a second SCSI bus connected to the bus device at the standard SCSI data rate.

12. The SCSI repeater circuit of claim 11, further comprising:
    logic for determining that the data rate of the first SCSI bus has increased above the standard SCSI bus rate; and, if so,
    logic for driving the second SCSI bus at a higher standard SCSI bus rate corresponding to the increased data rate of the first SCSI bus.

13. The SCSI repeater circuit of claim 11, wherein the standard SCSI data rates are comprised of:
    asynchronous;
    synchronous-5;
    synchronous-10;
    synchronous-20; and
    synchronous-40.

14. The SCSI repeater circuit of claim 11, the repeater circuit further comprising:
    logic for determining whether the first and second SCSI buses are both in a low voltage differential mode; and, if so,
    logic for driving the first and second SCSI buses at a rate of synchronous-40.

15. A SCSI repeater circuit connected to a first SCSI bus, the repeater circuit comprising:
    logic for providing a clock on the first SCSI bus set at a multiple of the highest frequency of a standard SCSI bus;
    logic for determining a current data rate of the first SCSI bus; and
    logic for driving a second SCSI bus at a rate corresponding to a plurality of the clock cycles, wherein the plurality is set to most closely match the second SCSI bus adaptive to the current data rate of the first SCSI bus.

16. The SCSI repeater circuit of claim 15, wherein the repeater circuit further comprises:
    logic for determining that the data rate of the first SCSI bus has increased; and, if so,
    logic for driving the second SCSI bus at an increased data rate corresponding to the increased data rate of the first SCSI bus.

17. The SCSI repeater circuit of claim 15, wherein the multiple of the highest frequency of the standard SCSI bus is 240 Mhz.

18. The SCSI repeater circuit of claim 15, wherein the standard frequencies of a SCSI bus are comprised of:

asynchronous;
synchronous-5;
synchronous-10;
synchronous-20; and
synchronous-40.

19. A storage system, the storage system comprising:
  a plurality of SCSI mass storage devices in an enclosure; and
  a repeater circuit coupled to the SCSI mass storage devices via a first SCSI bus, the repeater circuit comprising:
    logic for determining a current data rate of the first SCSI bus;
    logic for determining a standard SCSI data rate corresponding to the current data rate of the first SCSI bus when the current data rate is not equal to the standard SCSI data rate; and
    logic for driving a second SCSI bus connected to the bus device at the standard SCSI data rate.

20. The storage system of claim 19, the repeater circuit further comprising:
  logic for determining whether the data rate of the first SCSI bus has increased above the standard SCSI data rate; and, if so,
  logic for driving the second SCSI bus at a higher standard SCSI data rate corresponding to the increased data rate of the first SCSI bus.

21. The storage system of claim 19, wherein the standard SCSI data rates are comprised of:
  asynchronous;
  synchronous-5;
  synchronous-10;
  synchronous-20, and
  synchronous-40.

22. The storage system of claim 19, the repeater circuit further comprising:
  logic for determining whether the first and second SCSI buses are both in a low voltage differential mode; and, if so,
  logic for driving the first and second SCSI buses at a rate of synchronous-40.

23. A storage system, the storage system comprising:
  a plurality of SCSI mass storage devices in an enclosure; and
  a repeater circuit coupled to the SCSI mass storage devices via a first SCSI bus, the repeater circuit comprising:
    logic for providing a clock on the first SCSI bus set at a multiple of the highest frequency of a standard SCSI bus;
    logic for determining a current data rate of the first SCSI bus; and
    logic for driving a second SCSI bus at a rate corresponding to a plurality of the clock cycles, wherein the plurality is set to most closely match the second SCSI bus adaptive to the current data rate of the first SCSI bus.

24. The storage system of claim 23, wherein the repeater circuit further comprises:
  logic for determining that the data rate of the first SCSI bus has increased; and, if so,
  logic for driving the second SCSI bus at an increased data rate corresponding to the increased data rate of the first SCSI bus.

25. The storage system of claim 23, wherein the multiple of the highest frequency of the standard SCSI bus is 240 Mhz.

26. The storage system of claim 23, wherein the standard frequencies of a SCSI bus are comprised of:
  asynchronous;
  synchronous-5;
  synchronous-10;
  synchronous-20; and
  synchronous-40.

27. A system, the system comprised of:
  a computer; and
  a storage system coupled to the computer, the storage system comprising;
    a plurality of SCSI mass storage devices in an enclosure; and
    a repeater circuit coupled to the SCSI mass storage devices via a first SCSI bus, the repeater circuit comprising:
      logic for determining a current data rate of the first SCSI bus;
      logic for determining a standard SCSI data rate corresponding to the current data rate of the first SCSI bus when the current data rate is not equal to the standard SCSI data rate; and
      logic for driving a second SCSI bus connected to the bus device at the standard SCSI data rate.

28. The system of claim 27, the repeater circuit further comprising:
  logic for determining whether the data rate of the first SCSI bus has increased above the standard SCSI data rate; and, if so,
  logic for driving the second SCSI bus at a higher standard SCSI data rate corresponding to the increased data rate of the first SCSI bus.

29. The system of claim 27, wherein the standard SCSI data rates are comprised of:
  asynchronous;
  synchronous-5;
  synchronous-10;
  synchronous-20, and
  synchronous-40.

30. The system of claim 27, the repeater circuit further comprising:
  logic for determining whether the first and second SCSI buses are both in a low voltage differential mode; and, if so,
  logic for driving the first and second SCSI buses at a rate of synchronous-40.

31. A system, the system comprising:
  a computer; and
  a storage system coupled to the computer, the storage system comprising;
    a plurality of SCSI mass storage devices in an enclosure; and
    a repeater circuit coupled to the SCSI mass storage devices via a first SCSI bus, the repeater circuit comprising:
      logic for providing a clock on the first CSI bus set at a multiple of the highest frequency of a standard SCSI bus;
      logic for determining a current data rate of the first SCSI bus; and logic for driving a second SCSI bus at a rate corresponding to a plurality of the clock cycles, wherein the plurality is set to most closely match the second SCSI bus adaptive to the current data rate of the first SCSI bus.

32. The system of claim 31, wherein the repeater circuit further comprises:

logic for determining that the data rate of the first SCSI bus has increased; and, if so, logic for driving the second SCSI bus at an increased data rate corresponding to the increased data rate of the first SCSI bus.

33. The system of claim 31, wherein the multiple of the highest frequency of the standard SCSI bus is 240 Mhz.

34. The system of claim 31, wherein the standard frequencies of a SCSI bus are comprised of:

asynchronous, synchronous-5;

synchronous-10;

synchronous-20; and synchronous-40.

\* \* \* \* \*